Oct. 26, 1937.  G. RAUSCH  2,097,042
VERTICAL HEAD DOUGH DIVIDER AND MOLDER
Filed April 11, 1936   4 Sheets-Sheet 3

INVENTOR
Gottfried Rausch
BY George S. Hastings
ATTORNEY

Oct. 26, 1937.  G. RAUSCH  2,097,042
VERTICAL HEAD DOUGH DIVIDER AND MOLDER
Filed April 11, 1936  4 Sheets-Sheet 4
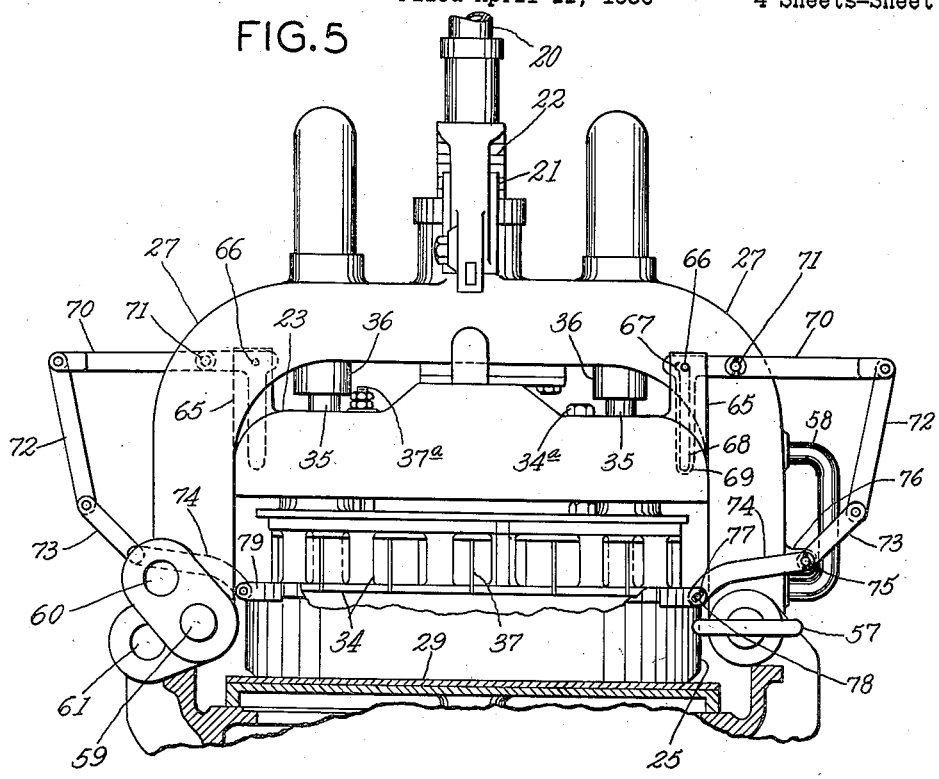
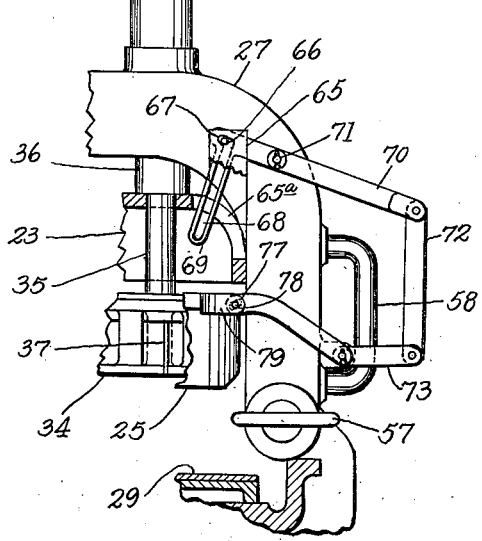
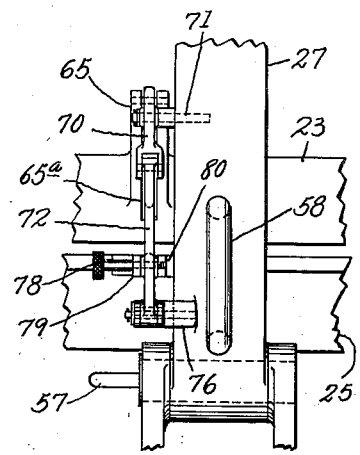
INVENTOR
Gottfried Rausch
BY George S. Hastings
ATTORNEY Patented Oct. 26, 1937

2,097,042

UNITED STATES PATENT OFFICE 2,097,042

VERTICAL HEAD DOUGH DIVIDER AND MOLDER

Gottfried Rausch, Amendorf, Germany

Application April 11, 1936, Serial No. 73,864

19 Claims. (Cl. 107—20)

This invention relates to semi-automatic dough dividing and kneading machines, more particularly to those of the vertical head type in which means are provided for vertically moving the dough pressing and dividing means to and from the dough receiving and supporting table.

In these machines it is customary either to pivot the head for vertical movement or to mount it in a frame for vertical reciprocatory movement to and from the dough working position. The machine of the present invention is of the latter type. In known machines, it is old to pivot the head supporting frame so that it may be moved to bring the head away from the dough supporting table and allow easy access to the parts thereof for cleaning, but no means have been provided as in this invention for locking the head and frame in inoperative position so that the operator and machine are protected while the parts are being cleaned.

In machines provided with dough confining rings adapted to drop by gravity upon the dough working table heretofore, it has been customary to support said rings by pawls which are upset by downward motion of the head and then provide spring hangers to snub the downward movement and prevent jar and shock due to the falling ring contacting the table. I have simplified this construction by attaching spring bumpers to the machine frame, which perform this function and at the same time make the removal of the ring for cleaning purposes much simpler.

In my machine means are also provided to press the ring down against the table so that it will not be moved upward during the pressing operation.

In the prior art it has also been customary to provide pressing means for compressing a batch of dough on the table. In these constructions the dough pressing means remains in contact with the pressed dough after the latter has been divided and moves up with the dough during kneading operations. The dough pressing means of this invention differs over that of the prior art in that the knives may not be operated to divide the dough until the pressing operation is complete and the plate released. Means are provided for immediately raising the presser plate after its release and the knives may then be lowered farther to divide the dough.

It is an object of this invention therefore, to improve upon existing dough dividing and kneading machines and provide a simpler and better constructed machine.

It is a further object to provide a machine wherein all operations of pressing and dividing are accomplished by a single operating means, and in which a device is provided for lifting the press plate prior to the dividing of the pressed dough.

It is also an object of this invention to render the operation of the machine easier by mounting the dividing head for vertical movement under the control of a single counter balanced operating handle only, whereby the number of operating members is cut down.

It is a further object to provide means for detachably supporting the dough confining ring and spring buffers mounted upon the machine frame for allowing the ring to fall by gravity upon the dough supporting table and take up the shock as the ring falls upon the table. Also, to provide means mounted upon the knife carrying cross head for holding the ring upon the working table in dough confining position during dough compressing operations.

It is a further object to so construct and mount the presser plate in the head that it may be moved into compressing relation with a batch of dough and compress it before dividing operations are begun; and to provide means whereby said plate may be released and move upward to provide a space between said compressed dough and allow the knives to be moved to cutting position.

It is also an object to provide a locking device so that the entire head and supporting frame may be lifted from operative position and locked above the dough supporting table to allow access to the several parts of the head for cleaning purposes.

With these and other objects not mentioned in view, the invention consists in certain constructions and combinations which will be hereinafter fully described and then specifically set forth in the claims hereunto appended.

In the accompanying drawings which form a part of this specification, and in which like reference characters indicate the same or like parts:

Fig. 5 is a partial front elevation, partly in cross-section of a modified form of the improved dough dividing and working machine;

Fig. 6 is a detail view of Fig. 5 showing the dough confining ring in its inoperative position; and Fig. 7 is a side view of Fig. 6.

Figure 1:
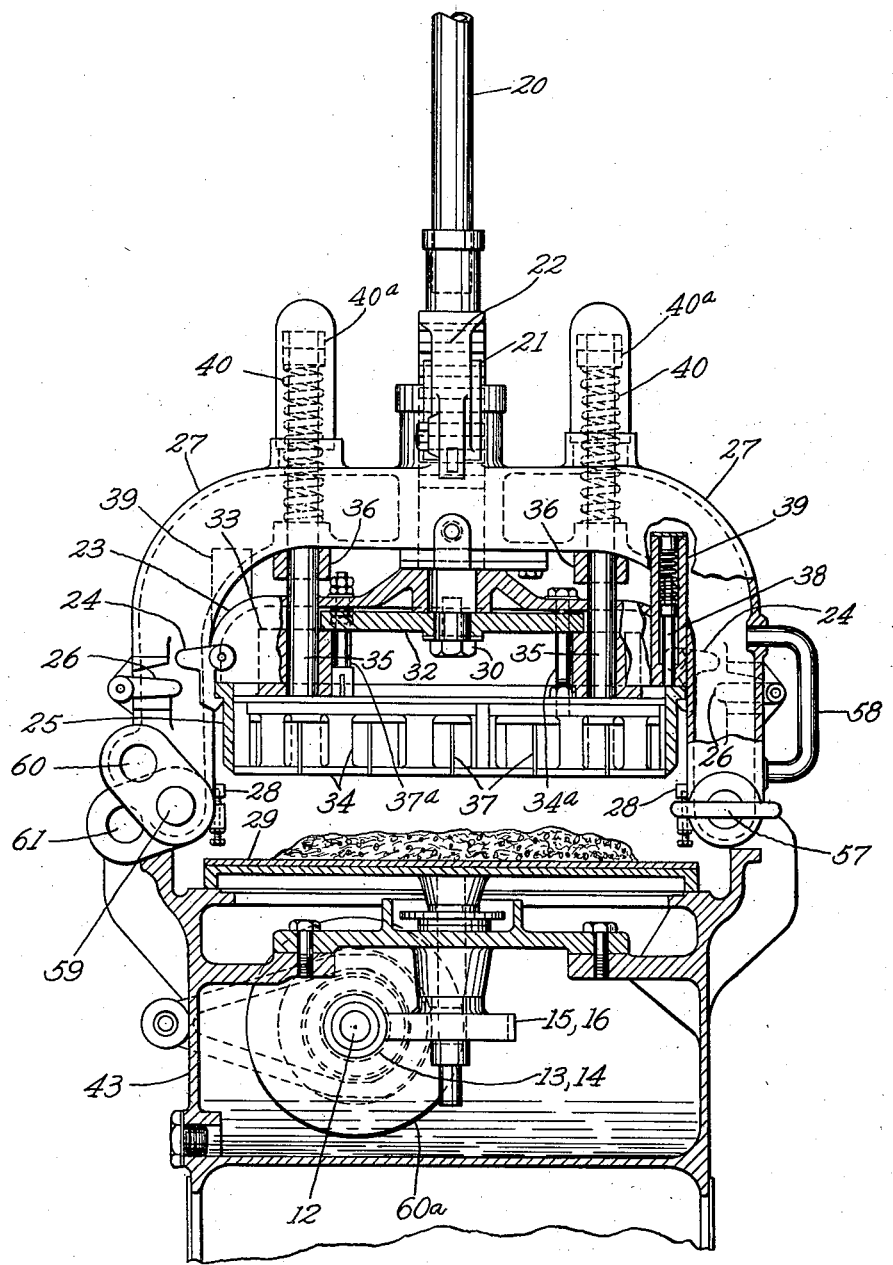
Fig. 1 is a front elevation, partly in cross-section, of the improved semi-automatic dough dividing and molding machine.

Referring to the drawings, the machine is driven by a motor or by other suitable means (not shown) which, through a clutch 10—11 mounted on main shaft 12, actuates a pair of spiral gears 13 and 14 driving, through spiral gears 15 and 16, crank shafts 46 and 47 carrying crank disks upon which are mounted the eccentric vertical dough-rolling pins 17 and 18, respectively. Positioned upon said pins for rotary movement therewith is a support carrying a dough depositing plate 29.

The pressing and dividing of the dough is accomplished by manipulation of a main hand lever 20 pivotally mounted in frame 27. A gear segment 21 integral with lever 20 meshes with and operates a rack 22 which is slidably mounted in frame 27 and fastened to a knife cross 23. The knife cross is equipped with pivotally mounted pawl members 24 engaging and holding a ring 25 in position as shown in Fig. 1. The knife cross 23, when descending, causes the members 24 to be directed against projections 26 provided on the frame 27, whereby the members 24 are swung from their ring holding position, thus releasing said ring and allowing it to drop. In dropping, the ring 25 encounters the adjustably mounted bumpers 28, carried by frame 27, which absorbs the shock, thus eliminating hard striking of the ring against the dough plate 29.

Figure 3:
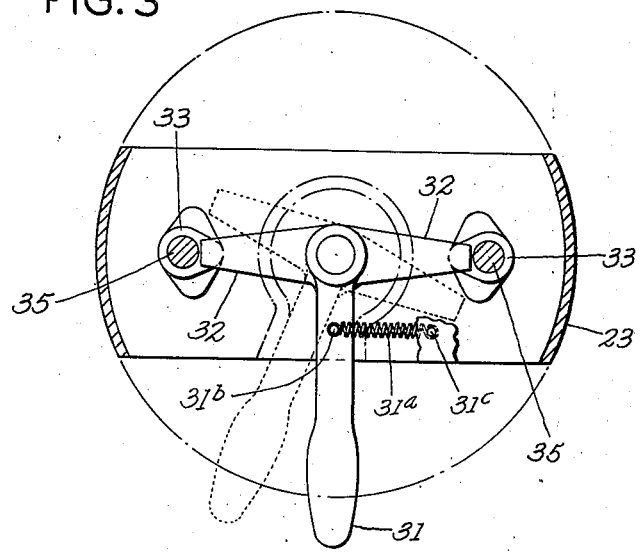
Fig. 3 is a plan view of the press plate releasing unit.

A stud 30 carried by the rack 22, supports a pivotally mounted lever 31 (Fig. 3) having extending arms 32 engaging the top of hubs 33 provided on the press plate 34. The arms 32 are disengaged from said hubs at the proper time by means of a handle (see Fig. 3) formed integral with said lever. The press plate is connected to slidably mounted rods 35 which are guided in hubs 36 of frame 27. The rods 35 at their free ends are equipped with collars 40a between which and hubs 36 are placed coil springs 40 which become compressed when the press plate 34 is lowered. The press plate is also supported upon knife cross 23 by means of hangers 34a loosely mounted therein. The springs 40 are employed to return the press plate to its up position, as soon as press plate 34 has completed its duties and is released. In the event that springs 40 do not elevate the press plate to its highest point, it will be moved to that position by engagement of knife cross 23 with the heads of hangers 34a.

When the knife cross is back in its starting position, a spring 31a, stretched between a stud 31b and 31c lodged in lever 31 and cross 23 respectively, then pulls the lever from its dotted line or presser plate disconnecting position to its full line or pressing position. The dividing knives 37 are of the star dough dividing type; a construction common and well known in the art. These knives are fixedly secured by bolts 37a to the knife cross for movement to and from dough dividing position.

Figure 4:
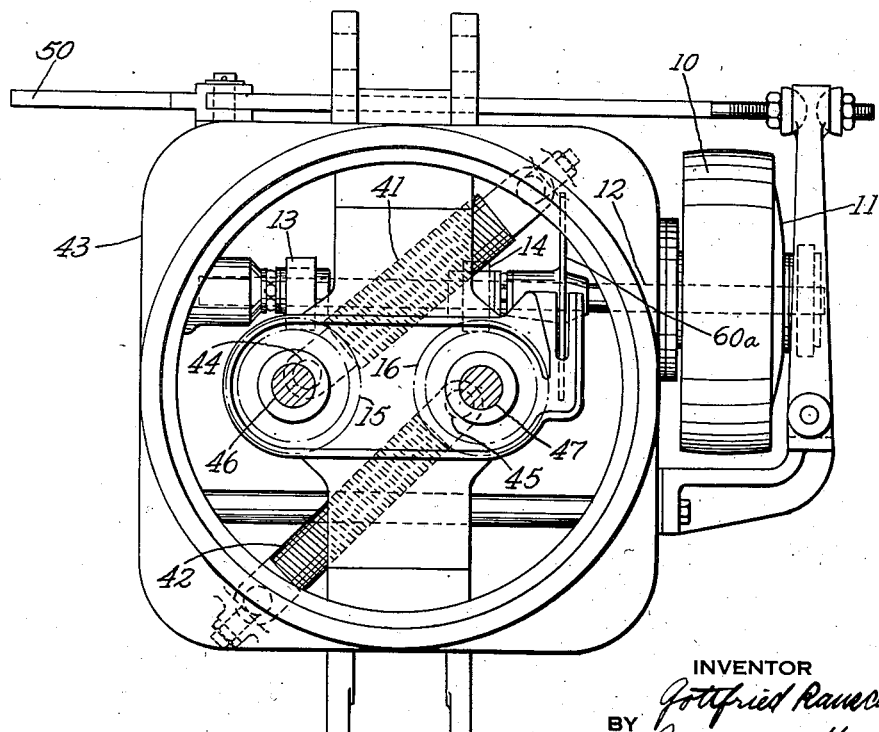
Fig. 4 is a plan view showing the drive, and means for returning the dough-pressing plate to its definite starting position.

To roll the dough, relative motion between the dividing mechanism and the dough supporting plate takes place. When the dough batch is placed upon plate 29, the dividing mechanism must be concentric with the dough-plate, otherwise the portions projecting beyond the former will be cut off. The moving part must therefore be returned to a definite starting position before each new cycle, and it is a further object of this invention to perform this return motion automatically, in a simple and efficient manner. For this purpose, springs 41 and 42 (Fig. 4) are employed which are anchored to the frame 43 of the machine and act on studs 44 and 45, respectively, eccentrically attached to crank shafts 46 and 47. The springs always tend to occupy their least length and thereby carry the shafts 46 and 47 and, with them, the support and dough-rolling plate 29 positioned thereon, back into its starting position as soon as the drive is disengaged.

Figure 2:
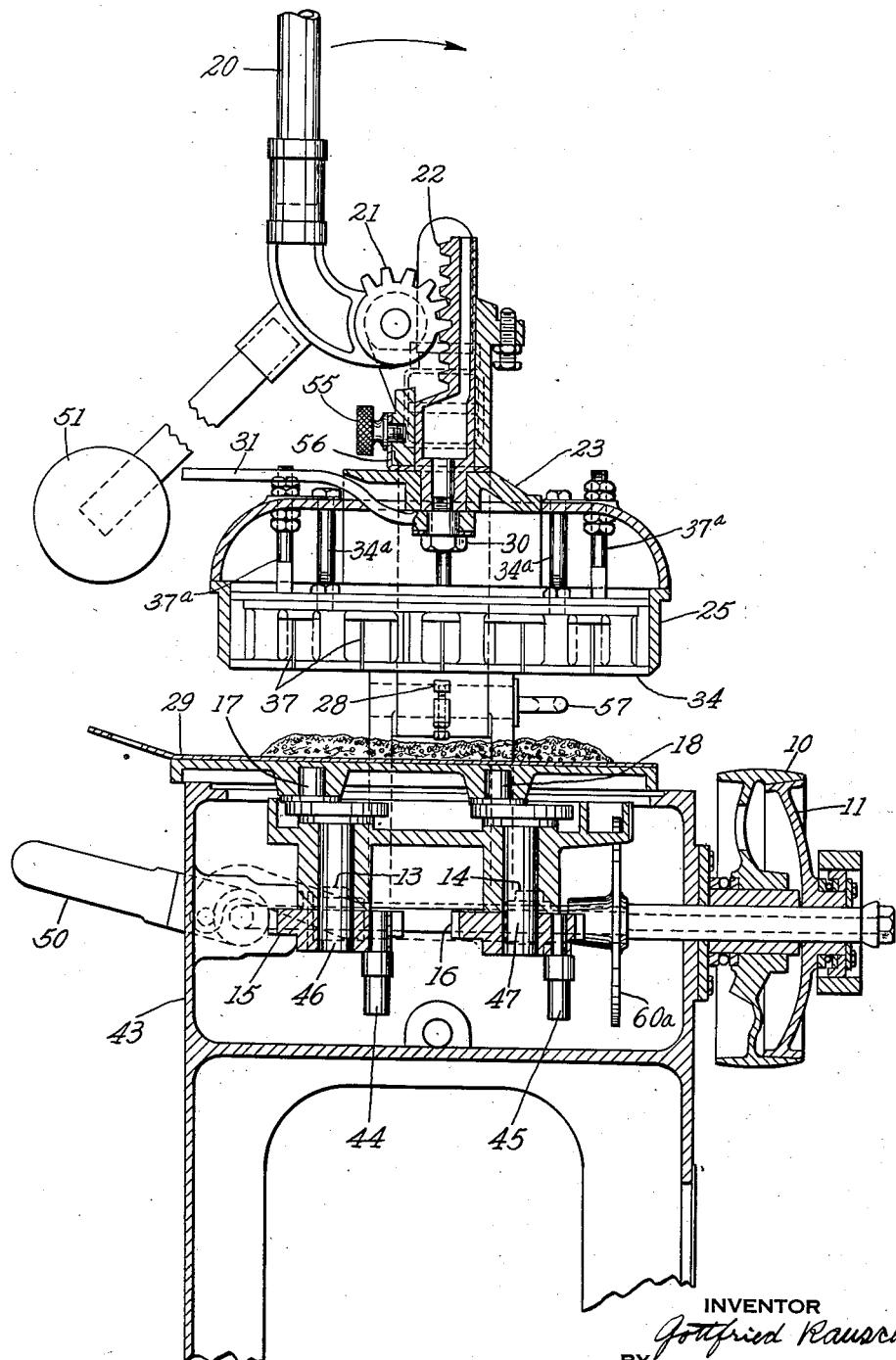
Fig. 2 is a sectional side elevation of the same.

The operation of the machine is as follows. When a batch of dough is placed upon plate 29, the operator pulls the lever 20, in the direction indicated by an arrow shown in Fig. 2, whereby the knife cross, press plate and ring commence to descend, due to their connection with the gear and rack arrangement. The ring 25, as previously described, in descending is released from the knife cross 23 when pawls 24 contact pivoted projections 26, and drops on to the dough plate 29; in this position, it surrounds the lump of dough, thus preventing the same from being pressed beyond the contour of the press plate, when the latter acts upon the dough. The ring in falling, sets free a pair of spring actuated plungers 38, which are enclosed in housings 39 of the member 23. The continued descent of lever 20, allows these plungers 38 to engage the rim of the ring 25 shortly before the press plate encounters the lump of dough on plate 29. In this manner, the ring 25 is retained against the dough plate thus preventing lifting of the ring during the pressing and other operations. The plate 34 then presses out the dough and, when the dough is compressed, to its right consistency for cutting, the operator manipulates the lever 31 to its dotted position, shown in Fig. 3, thus freeing the cross arms 32 from engagement with hubs 33 of the press plate, and permits the springs 40 to return said press plate to its up-position. As the press plate rises, the operator continues to pull the lever 20 whereby the knife 37 is pushed into the compressed dough and divides the same into individual pieces which are then rolled. A clutch handle 50 is now operated and by means of suitable connections of conventional design, throws in the clutch 10—11 which through its drive imparts motion to the dough plate 29. Upon the completion of the rolling motion, the clutch is disengaged, and the operator releases the lever 20 which is carried back to its starting position by means of a counter weight 51. It is seen that the knife cross, knife and ring are also returned to their up-position by means of the gear and rack arrangement. The ring 25, which had been released from the cross 23, is again picked up by means of the members 24 which engage the ring when the knife cross is in its down or cutting position. In rising, the members 24 engage and lift the pivoted members 26 out of their path, the latter falling back into their knock-out position when the members 24 have passed by. In the meantime, the springs 41 and 42 have carried the support and the dough plate 29 positioned thereon back into its starting position so that now the machine is ready for a new run as soon as the finished rolls have been removed and a new batch of dough has been inserted.

When necessary to clean the dividing arrangement, the mechanism is in its up-position and the ring 25 released so as to rest on the plate 29. A knurled screw 55 and a shim 56 are then removed which permits the springs 46 to raise the unit sufficiently to free the ring 25 which is then removed from the machine. A bolt 57 which normally ties the frame 27 to the casing 43 is then removed and, by means of a handle 58 the entire dividing unit is swung about its pivot 59. When a hole 60 in the frame 27 and a hole 61 in the casing 43 are in alignment, the bolt 57 previously removed is inserted into this hole 60—61, thus retaining the unit in its up-position while the cleaning is accomplished.

Because of its compact arrangement, the entire drive, which is disposed in the upper part of the casing of the machine can be so housed that all its parts run in oil. A disk or wheel 60a, mounted on shaft 12, is provided to carry oil to bearings and other moving parts situated above the oil level in the gear housing.

In the modified form disclosed in Figs. 5, 6 and 7, the knife cross 23 is equipped with a pair of lugs 65, each of which supports an operating pin 66 engaging in a horizontal slot 67 and a vertical guide slot 68 provided in an arm 69. The lugs 65 and a portion of the cross 23 are provided with a slot 65a which permits movement of the arm 69. Arm 69 integral with a lever 70 is pivotally mounted on a stud 71 carried by the frame 27. The forked end of lever 70 supports a link 72 connecting an arm 73 of the ring actuating lever 74 which is pivotally mounted on a stud 75 supported in a lug 76 of frame 27. Lever 74 is provided with an elongated slot 77 which engages a stud 78 carried by the members 79 and 80 attached to ring 25.

When the lever 20 is pulled, it causes the cross 23 to descend; in descending, the pins 66 engage the slots 67 thereby swinging the arms 69 from their position shown in Fig. 6 to their vertical position shown in Fig. 5, whereby the ring 25, through its linkage, moves from its up-position to a position resting on the dough plate 29. As the ring approaches plate 29 the slots 77 allow the ring to drop a very short distance onto the plate against which it is held during the dough working operations. The continued pulling of lever 20, as heretofore described, completes the pressing and cutting of the dough and, when the rolling operation has been completed, the lever 20 is released whereby the unit is returned to its up-position. The cross 23 and pins 66 in ascending travel idly until the latter engage the horizontal slots 67 thereby swinging the arms 69 which, through their connections, actuate the levers 74 which lift the ring 25 to its up-position shown in Fig. 6. The cross 23 in ascending stops against the hubs 36 of frame 27 whereby the ring is always returned to its predetermined up-position.

When necessary to clean the dividing arrangement, the bolt 57 is removed and by means of a handle 58 the entire unit is swung about its pivot 59 until the holes 60—61 align, the bolt 58 previously taken out being inserted into this hole 60—61, thus retaining the unit in its up-position. The studs 78 are now removed, permitting the ring 25 to be lifted out of the machine, whereby the knife and press plate may now be cleaned.

The various means referred to may be varied widely in construction within the scope of the claims for the particular device selected to illustrate the invention is but one of many possible concrete embodiments of the same. The invention is not, therefore, to be restricted to the precise details of the structure shown and described.

What is claimed is:

1. In a dough dividing and kneading machine, the combination with a cross head having means for dividing the dough, of means for pressing said dough, a rotatable dough receiving and working table, a single manually operable lever connected to said dividing means for raising and lowering it into and out of dividing position, a device for maintaining said pressing means in operative relation with respect to said dividing means, whereby said pressing means may be brought into contact with the dough on the table to compress the same, said device including an element mounted in said head for disconnecting the pressing means from operative relation with said dividing means, and means independent of said lever for elevating said pressing means away from the compressed dough prior to operation of said dividing means.

2. In a dough dividing and kneading machine, the combination with means for dividing the dough, of a rotatable dough supporting and working table, means for pressing said dough thereon, a manually operable lever connected to said dividing means for moving it vertically to and from said table, means supporting said pressing means for movement with said dividing means whereby in the downward movement dough on said table may be compressed, and a device for releasing said pressing means from pressing relation with respect to said dough prior to the dividing thereof, said device including a lever having a plurality of arms pivotally carried by said dividing means and adapted to release said pressing means for vertical movement, lugs carried by said pressing means and against which said lever arms bear, rods carried by said plate and means normally urging said rods vertically away from said table.

3. In a dough dividing and kneading machine, the combination with a frame, a rack vertically movable therein, a dough pressing and dividing device carried by said rack for vertical movement, a single manually operable lever for operating said device, said device comprising a dividing head including a series of knives, a pressing plate loosely carried by said device, a dough confining ring detachably carried by said device, projections mounted on the frame for detaching said ring from said device during downward movement thereof whereby said ring may fall by gravity towards said table, buffers mounted on said frame for stopping descent of said ring, and spring pressed elements for urging said ring against said table.

4. In a dough dividing and kneading machine, the combination with a rotatable table for supporting a batch of dough to be worked, of a frame, a vertically movable head mounted in said frame, comprising a dough dividing member, a pressing plate, a ring, pivotally mounted pawls detachably securing said ring to said head, a single, manually operated lever connected to said dividing means for moving it to and from dividing position, projections carried by said frame and cooperating with said pawls for releasing said ring and allowing it to fall by gravity onto said table whereby the dough batch is confined against radial expansion, rods carried by said pressing plate and movable in said frame, springs normally urging said rods into upward position to return said plate to inoperative position prior to upward movement of said head and spring pressed members for urging said ring against said table.

5. In a dough dividing and kneading machine, having a rotatable dough supporting and working table, the combination with a head, of a single, operable lever associated with said head for raising and lowering it into operative position with respect to a dough batch positioned on said table, said head comprising a dough dividing mechanism, a pressing plate unit mounted for downward movement therewith into contact with said dough, vertically slidable rods secured to said pressing plate unit, springs encircling said rods and normally urging said unit into inoperative position, means for releasing said pressing unit after the pressing operation and prior to the dough dividing operation, and means for restoring said releasing means to plate securing position upon upward movement of said head.

6. In a dough dividing and kneading machine, a rotatable dough supporting and working table, means for pressing a batch of dough thereon, dough dividing mechanism, a single manually operated lever connected only to said dividing mechanism to move it to and from dividing position, means carried by the dividing mechanism for forcing said pressing means against said batch prior to complete downward movement of said lever, a releasing element mounted on said dividing mechanism and adapted to release said pressing means therefrom, whereby upon complete downward movement of said lever said dividing unit may be moved to divide said pressed dough, and means to elevate said pressing means to form a kneading space between the plate, and pressing means prior to rotation of said plate.

7. The combination with a rotary table adapted to receive a batch of dough, of a press plate, means for pressing said plate against said batch of dough on said table, means for thereafter raising said plate from said pressed dough after said pressing operation, and means for cutting said dough after said plate has been raised.

8. In a dough dividing and kneading machine, a frame, a dough dividing head carried in said frame, a plate support for a dough batch, a compressing plate associated with said head for downward movement only therewith, a ring carried by said head, locking means carried by the head for detachably securing it to said head, projections on the frame for upsetting said locking means, whereby said ring may drop by gravity against said support, and buffers carried by said frame for absorbing the shock of said falling ring.

9. The combination with a device for dividing dough, of a frame, a rotatable dough supporting table, a ring releasably carried by said device, pawls releasably securing said ring to said device, projections on the frame for releasing said ring on the downward movement of said device whereby it may fall by gravity and confine a charge of dough on said table, and resilient pressing members for forcing said ring against said table.

10. In a dough dividing and kneading machine, a casing, a frame pivotally mounted upon said casing, said frame and casing being provided with openings adjacent the pivotal point and the free ends, a dough manipulating head carried by said frame, a removable pin inserted through the openings adjacent the free ends of the frame and casing, whereby upon removal of said pin the frame and head carried thereby may be swung upward until the openings adjacent the pivoted point are in alignment to receive said pin for locking the frame in lifted position.

11. The combination with a frame, of a cross head, dough dividing means secured to said cross head for movement therewith, a dough pressing member loosely mounted on said cross head for downward movement with said dividing means, supporting devices slidable in said frame secured to said pressing member, means carried by said head for holding said member in pressing position on said downward movement, and means associated with said devices for lifting said member at the close of the pressing operations.

12. In a dough dividing and kneading machine, the combination with a dough supporting table, of a dough pressing plate adapted to press said dough against said table, a dough dividing member, a single manual operating lever connected only to said dividing member to move it to and from dividing position, a device carried by said member for moving said press plate against said dough on the downward stroke of said lever, control means carried thereby for releasing said plate from further downward travel, means for elevating said plate after its release whereby a kneading space is furnished between said raised plate and table prior to division of said dough, and means for re-establishing operative connections between said device and dividing member.

13. In a dough dividing and kneading machine having a frame, the combination with a dough supporting and working table for a batch of dough, of a vertically movable dough working head, comprising a dough dividing member, a pressing plate, a single manually operated lever connected to said head for moving it to and from dough pressing and dividing position, rods carried by said plate and vertically movable in said frame, springs encircling said rods and normally urging said rods into upward position, a dough confining ring, mechanism connecting said ring to said head for movement therewith, and means for maintaining said ring upon said table, during dough working operations.

14. In a dough dividing and kneading machine, having a frame and a rotatable dough supporting and working table, the combination with a head, means associated therewith for lowering and raising said head to and from operative position with respect to a batch of dough positioned upon said table, said head comprising a dough dividing device, a presser plate unit mounted for downward movement therewith into contact with said dough, vertical members carried upon said unit and slidable in said frame, springs surrounding said members and normally urging said unit into inoperative position, means for releasing said presser unit after its pressing operation and prior to the dough dividing operation whereby said springs will raise said unit above said compressed dough, a dough confining ring, means connecting said ring to said head for movement therewith, and means for preventing upward movement of said ring during dough working operations.

15. In a dough dividing and kneading machine, the combination with a dough pressing and dividing head and a rotatable dough receiving and supporting table, of a single device for moving said head to and from dough pressing and dividing position, a dough confining ring adapted to rest upon said table during dough working operations, and mechanism connecting said head and ring for joint movement to and from said table, said mechanism including means for positioning said ring against upward movement during the dough working operations of said movable table.

16. The combination with a frame, a table adapted to support a batch of dough to be divided and kneaded, of a dough working head, comprising a press plate, and a dividing mechanism, a dough confining ring, means for raising and lowering said head and ring into dough working position, wherein said ring rests upon said table, said means including lugs carried on said head, levers pivoted on said frame and connected to said head and ring, and links connecting the free ends of said levers.

17. In a dough dividing and kneading machine, the combination with a frame having spaced arms, of a dough working head, a dough receiving and supporting table, a dough confining ring, and mechanism connecting said head and ring for moving them to and from said table and relative to each other, and for holding said ring upon said table during dough working operations, said mechanism including connections between said frame and ring for controlling the movement of said ring relative to said head.

18. In a dough dividing and kneading machine, the combination with a frame having spaced arms, of a dough working head, a dough receiving and supporting table, a dough confining ring, and mechanism connecting said head and ring for moving them to and from said table and relative to each other, and for holding said ring upon said table during dough working operations, said mechanism including slotted lugs carried at opposite sides of said head, levers pivoted on each arm of said frame and having therein L-shaped slots, pins connecting said levers to said lugs for movement therein, levers pivoted to said frame arms and connected to opposite sides of said ring and links connecting the free arms of said levers.

19. In a dough cutting and kneading machine, the combination with a rotary table adapted to receive a batch of dough, of a head movable to and from said table, a press plate for pressing a batch of dough carried by said head, means for holding said plate in dough pressing position, means for moving said head towards said table and pressing said plate against said batch of dough on said table during said movement, means for releasing said plate after said pressing operation, means for raising said plate from said pressed dough, and means for cutting said dough after said plate has been raised.

GOTTFRIED RAUSCH.